(12) United States Patent
Montgomery

(10) Patent No.: US 8,627,004 B2
(45) Date of Patent: Jan. 7, 2014

(54) EXTENT MIGRATION FOR TIERED STORAGE ARCHITECTURE

(75) Inventor: David Montgomery, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 634 days.

(21) Appl. No.: 12/683,753

(22) Filed: Jan. 7, 2010

(65) Prior Publication Data

US 2011/0167217 A1    Jul. 7, 2011

(51) Int. Cl.
*G06F 13/00*    (2006.01)

(52) U.S. Cl.
USPC .................................. 711/114; 711/E12.071

(58) Field of Classification Search
USPC ................................................ 711/114, 117
See application file for complete search history.

(56) References Cited

U.S. PATENT DOCUMENTS

| 5,659,704 | A | 8/1997 | Burkes et al. |
| 7,174,439 | B2 | 2/2007 | Nagase et al. |
| 7,293,133 | B1 | 11/2007 | Colgrove et al. |
| 7,574,560 | B2 | 8/2009 | MacHardy et al. |
| 2005/0071560 | A1* | 3/2005 | Bolik ............................ 711/117 |
| 2006/0004957 | A1 | 1/2006 | Hand, III et al. |
| 2008/0010325 | A1 | 1/2008 | Yamakawa |
| 2008/0104343 | A1* | 5/2008 | Miyagaki et al. ............. 711/158 |
| 2008/0147960 | A1 | 6/2008 | Sugino et al. |
| 2008/0168228 | A1* | 7/2008 | Carr et al. ..................... 711/117 |
| 2009/0043978 | A1 | 2/2009 | Sawdon et al. |
| 2009/0138530 | A1 | 5/2009 | Yao et al. |
| 2009/0228655 | A1 | 9/2009 | Yamane |
| 2010/0085353 | A1* | 4/2010 | Zhou et al. ................... 345/419 |
| 2011/0167217 | A1* | 7/2011 | Montgomery ................ 711/114 |

FOREIGN PATENT DOCUMENTS

| EP | 1918810 A2 | 5/2008 |
| WO | 2007009910 A2 | 1/2007 |

OTHER PUBLICATIONS

International Search Report for counterpart International Application No. PCT/EP20101070351, mailed Mar. 1, 2011.

* cited by examiner

*Primary Examiner* — Edward Dudek, Jr.
*Assistant Examiner* — Sean D Rossiter
(74) *Attorney, Agent, or Firm* — Griffiths & Seaton PLLC

(57) ABSTRACT

A method for data migration between each of a plurality of storage pools in a computing storage environment is provided. Each of the plurality of storage pools is categorized by a metric shared between data segments assigned to any one of the plurality of storage pools. The data segments are prioritized in the any one of the plurality of storage pools based on the metric. A discovery is performed for each of the plurality of storage pools, on a predetermined interval, based on the metric, whether a data segment with a highest priority on a child pool is greater than a data segment with a lowest priority on a parent pool. If so, the data segment with the highest priority on the child pool is promoted to the parent pool. A similar discovery process demotes the data segment with the highest priority on the parent pool to the child pool.

25 Claims, 4 Drawing Sheets

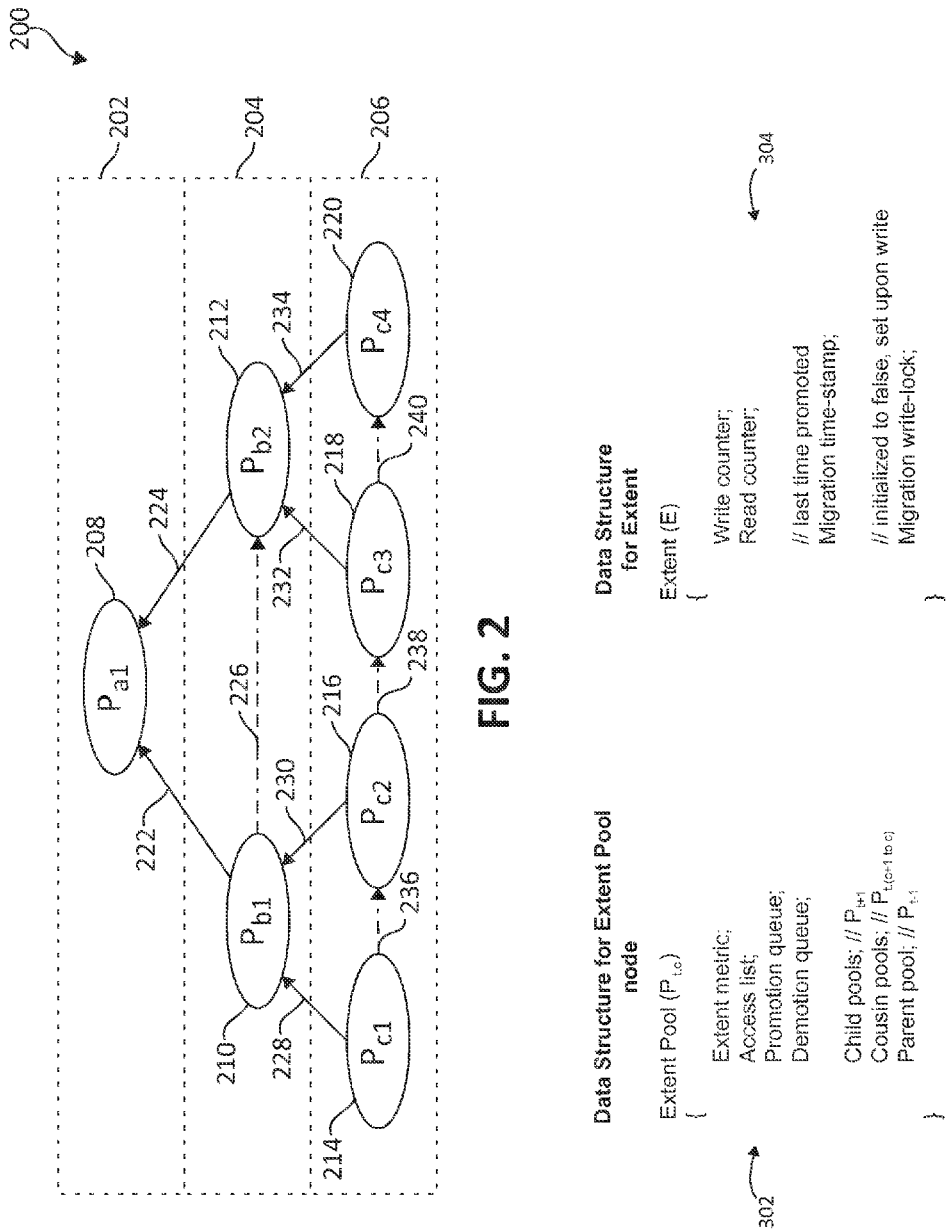

EXTENT MIGRATION FOR TIERED STORAGE ARCHITECTURE

BACKGROUND OF THE INVENTION

1. Field of the Invention

The present invention relates in general to computers, and more particularly to apparatus, method and computer program product embodiments for allocating and migrating data between pools in a computing storage environment using a tiered architecture.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE DESCRIBED EMBODIMENTS

Current tiered-storage architectures require the user, such as a system administrator, to personally manage on which storage ranks and associated tiers a given defined storage unit, such as a volume, will be created or migrated. Because the user may not recognize an optimal placement of the storage unit in a dynamic operating environment, an ideal solution to such placement may not be realized in some situations.

In view of the foregoing, a need exists for a mechanism for dynamic allocation and migration of storage units that repeatedly and accurately determines, from a systems performance standpoint, optimal solutions for storage unit placement. Accordingly, various method, system and computer program product embodiments are provided for data migration between each of a plurality of storage pools in a computing storage environment.

In one such embodiment, by way of example only, a method for data migration between each of the plurality of storage pools is provided. Each of the plurality of storage pools is categorized by a metric shared between data segments assigned to any one of the plurality of storage pools. The data segments are prioritized in the any one of the plurality of storage pools based on the metric. At least one discovery process is performed for each of the plurality of storage pools on a predetermined interval and based on the metric. One such process discovers whether a data segment with a highest priority on a child pool of the plurality of storage pools is greater than a data segment with a lowest priority on a parent pool of the plurality of storage pools. If this is the case, the data segment with the highest priority on the child pool is promoted to the parent pool if room is available.

Another such process discovers whether a data segment with a lowest priority on the child pool of the plurality of storage pools is less than a data segment with a highest priority on the parent pool of the priority of storage pools. If this is the case, the data segment with the highest priority on the parent pool is demoted to the child pool if room is available. Pursuant to promoting the data segment with the highest priority on the parent pool to the child pool and demoting the data segment with the highest priority on the parent pool to the child pool, a copy of the data segments with the highest priority on the child and parent pools are retained to allow for migration back in constant time.

In addition to the foregoing exemplary embodiment, various other method, system, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 2 illustrates a block diagram of an exemplary hierarchical tree structure, where, for example, each set of nodes of a given level within the storage-tree represents an extent tier containing a pool of extents;

FIG. 3 illustrates exemplary data structures including a data structure for an extent pool node and a data structure for an extent;

DETAILED DESCRIPTION OF THE DRAWINGS

Figure 1:
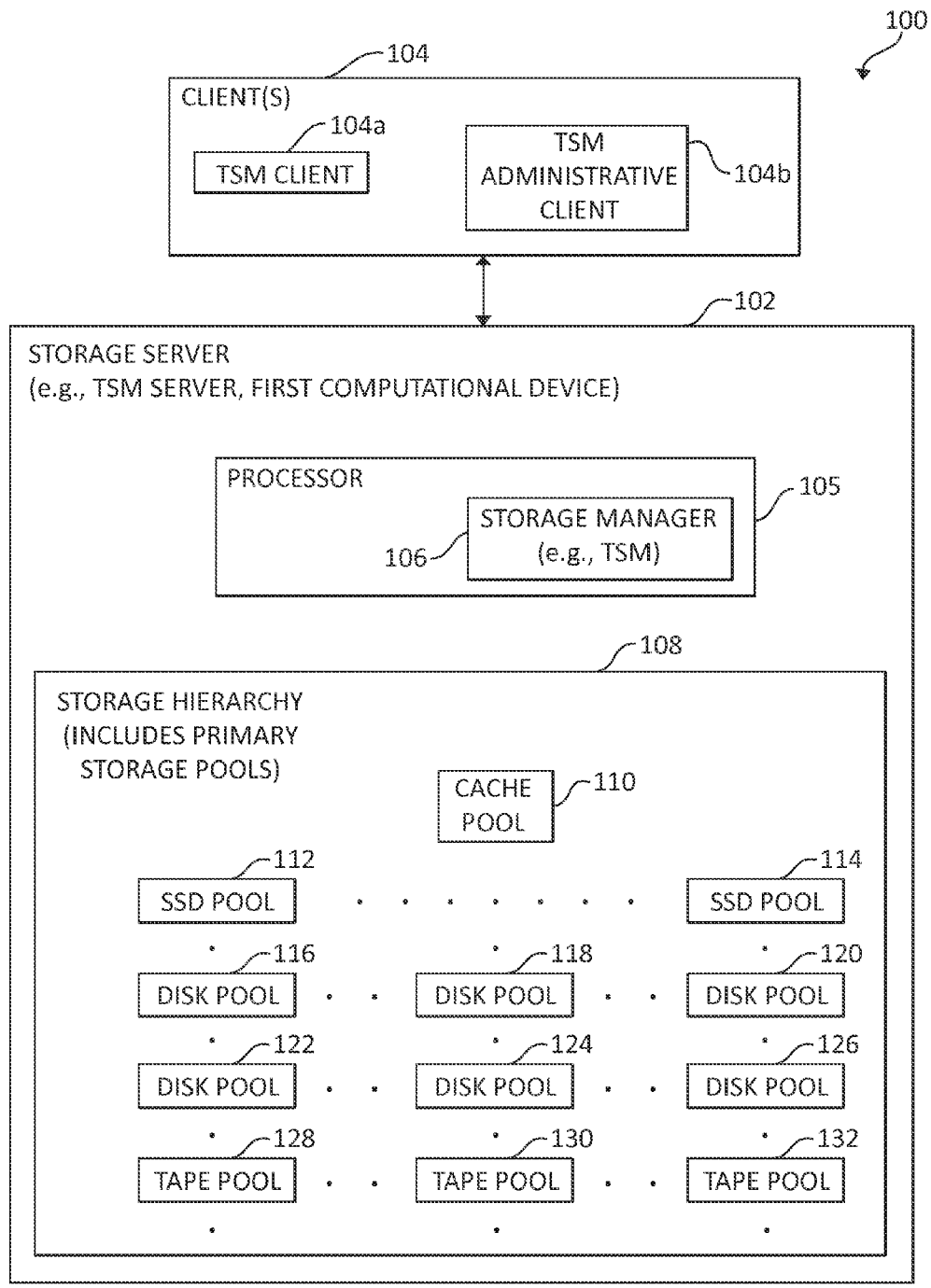
FIG. 1 illustrates a block diagram of an exemplary computing storage environment in accordance with certain embodiments.

The illustrated embodiments provide mechanisms for dynamically migrating (via, for example, discovery and promotion/demotion) data units within a hierarchical, virtual storage tree. The mechanisms function to maintain characteristics such as load-balance and optimal placement of data based on various metrics such as input/output (I/O) requests. In addition, the mechanisms of the illustrated embodiments provide for rapid migration (constant time) of "cold" data segments, such as extents. As a same segment may exist on two tiers of the virtual storage tree, promotion or demotion of the segment may be performed as quickly as moving pointers to the segment, provided the segment has not been modified in the migrating tier.

As will be further described, some embodiments of the present invention may use methodologies incorporating graph theory upon a tree-data structure, where each set of nodes of a given level within the storage-tree represents a data segment (again, e.g., extent)-tier containing a pool of segments. The root node of the tree may represent a highest-level tier containing so-called "hottest" data, and subsequent children nodes representing "colder data". Storage pools within the same tier (tree-level) may be referred to as cousins.

Hot and cold data may correspond to a number of data metrics, such as data having the highest I/O rate, or other metrics as one of ordinary skill in the art will appreciate, such as a ratio of read-to-write, access over a predetermined time interval for a particular storage class (e.g., cache, solid state drives (SSD), hard disk drives (HDD), redundant array of independent disks (RAID) ranks, and the like). In determining whether a migration operation should take place between pools, the same data metric comparison for child nodes is used for parent nodes. Generally speaking, those data segments assigned to parent nodes therefore exhibit more attributes of the particular metric under consideration than those assigned to children nodes.

Storage pools within the same tier (tree-level) may be referred to as cousins. For a given set of nodes within a tier, each node may represent a segment pool containing a list ordered-by the pool's metric, and include two first-in/first-out queues listing recently promoted or demoted segments. The queues ordered-by migration date represent those segments that are present within adjacent pools to potentially allow that data to be migrated back in constant-time, provided the data has not been modified.

For a given pool, data segments may only be deleted provided that the extent has been promoted (exits in higher tier), and further, upon a copy to this pool, not enough space exists. The data segment is then deleted from the bottom (oldest) of the promotion-list. In some embodiments, if a particular segment cannot be migrated within a parent-child relationship, the segment may be migrated to a cousin. Finally, in lieu of promotion and demotion operations, a swap operation may occur within the parent-child relationship as will be further described.

Turning now to FIG. 1, a block diagram of a computing storage environment 100 in accordance with certain embodiments is illustrated. The computing storage environment 100 includes a first computational device, such as, a storage server 102, coupled to one or more computational devices, such as, clients 104. In certain embodiments, the storage server 102 and the clients 104 may comprise any suitable computational device, including those presently known in the art, such as, a personal computer, a workstation, a mainframe, a midrange computer, a network appliance, a palm top computer, a telephony device, a blade computer, a hand held computer, etc.

In some embodiments, a storage manager 106, such as, the Tivoli® Storage Manager® (TSM) product marketed by International Business Machines (IBM®) Corporation, may be used for securely storing and managing data segments according to aspects of the present invention. The storage manager 106 may execute in a storage management server, such as a TSM server 102 or elsewhere. In one embodiment, the storage manager is operable by and/or in conjunction with processor device 105 as shown. One of ordinary skill in the art will appreciate that various other configurations of the processor 105, storage manager 106, and related additional processing and/or memory components are contemplated. IBM, Tivoli, and Tivoli Storage Manager are trademarks or registered trademarks of IBM Corporation.

The TSM may provide data storage services to clients, such as TSM clients 104a, for management of data. The TSM server 102 may store files sent to the TSM server 102 by one or more TSM clients 104a. The storage manager 106 and/or processor device 105 may allow a system administrator to configure storage pools, where a storage pool comprises a group of devices used for storing data received from the TSM client 104a. Storage pools are used as targets for store operations from the TSM client 104a and are referenced in TSM server policies and other constructs for processing.

As shown, a variety of storage devices may be organized into a storage hierarchy. Storage media within the storage hierarchy may thus be grouped into data structures referred to herein as storage pools. The storage hierarchy may be organized to correspond with one or more metrics, such as a performance metric previously described. The storage hierarchy 108 as shown may be organized such that the top of the hierarchy may include a cache pool 110 having a highest amount or quality of a particular performance metric. Below the cache pool 110, a number of SSD class devices may be organized into SSD pools by the same metric (e.g., SSD pools 112 and 114). Below the SSD pools 112 and 114, a first tier of disk pools (e.g., disk pools 116, 118, and 120) may be then organized.

The first tier of disk pools may be located above a second tier of disk pools (e.g., pools 122, 124, and 126) by virtue of exhibiting a greater amount, stronger attribute or attributes, or quality of the performance metric. Below the second tier of disk pools, an additional tier of tape pools (e.g., tape pools 128, 130, and 132) may then be organized. Various considerations for the organization of such storage hierarchies 108 are further described, following. In one embodiment, the system administrator may assist in performing such configurations in the storage hierarchy 108 by inputs to the TSM administrative client 104b or another mechanism.

Turning to FIG. 2 in view of FIG. 1, a block diagram of a hierarchical tree structure of storage pools 200 is depicted. The hierarchical tree structure 200 shows various storage pools in a parent-child relationship and cousin-cousin relationship as previously described. Here again, the various parent, child, and cousin pools may correspond to attributes exhibited of a particular metric, such as a performance metric. This may include such measurements as a read/write ratio, a number of writes per a specified time, striping and partitioning characteristics, and other related measurements. Pool 208 is depicted in the illustrated embodiment as the root of the tree structure 200 in a top tier 202. Below the pool 208, an additional set of cousin pools 210 and 212 are contained in tier 204. Still lower below the pool 210, an additional set of cousin pools 214, 216, 218, and 220 are contained in tier 206. As the skilled artisan will appreciate, any number of additional tiers including various cousin pools is contemplated for a particular implementation.

Each of the various storage pools 208-220 are interrelated as shown by the various arrows 222, 224, 226, 228, 230, 232, 234, 236, 238, and 240. Horizontal arrows 226, 236, 238, and 240 denote the cousin relationship between same-tier pools 210 and 212, and 214, 216, 218, and 220. From left to right, the cousin pools may exhibit an increasing quantity or quality of an attribute associated with the metric. Between tiers 202, 204, and 206, pursuant to the parent-child pool relationship, this attribute may vary more markedly than as between cousin pools. In contrast to horizontal arrows 226, 236, 238 and 240, vertical arrows 222, 224, 228, 230, 232, and 234 denote the parent-child relationship between each of the tiers 202, 204, and 206.

To illustrate the various relationships between parents and children pools, and cousin pools, consider the following example. Using an exemplary performance metric of accesses over a predetermined time interval, each of the various storage pools 208-220 may be organized such that data segments assigned to the root of the hierarchical tree (e.g., pool 208) may exhibit the hottest I/O activity (e.g., the greatest number of accesses per the interval). Pools 210, and 212 in tier 204 may then exhibit a certain amount less of the accesses per interval, and pools 214, 216, 218, and 220 may exhibit still less of the accesses per interval. Traversing from left to right across a particular tier, a leftward pool (e.g., pool 214) may exhibit less accesses per the interval than a rightward pool (e.g., pool 216), which increases correspondingly until a maximum amount of accesses per the given tier is realized in the far rightward pool (e.g., pool 220).

Accordingly then, each of the cousin pools in any one of the tiers in the hierarchy contain minimum and maximum attributes, qualities, amounts, or the like for a particular metric under consideration. For example, a particular data segment assigned to a certain storage pool meets a minimum number of attributes, etc., of the metric shared between the data segments in the certain pool, but does not exceed the maximum attributes of the metric for the certain pool.

As previously described, each of the various tiers 202, 204, 206 (and others not presently illustrated) may be organized to coincide with, not only a particular metric, but a relationship between the metric and characteristics of the storage media to which the data segments in a particular pool are assigned. For example, and as previously mentioned, tier 202 may be organized to coincide with a cache rank. Similarly, tier 204 may be organized to coincide with SSD-class devices and/or a redundant array of independent disks (RAID)-10 rank. Finally, tier 206 may be organized to coincide with tape-class devices and/or a RAID-5 rank. In this way, each of the storage media to which various data segments in a particular pool are assigned also bear some relationship to the tier and/or pool depending on attributes associated with the storage media itself.

Turning to FIG. 3, following, various exemplary data structures for nodes in a hierarchical tree structure (in this case, organized by extents) are shown. The first data structure 302 includes information to be associated with any one extent storage pool in the hierarchical tree. This information includes the particular extent metric under consideration, an access list of extents in the particular pool, a promotion queue of various extents scheduled to be promoted to a higher pool (e.g., either a parent or a higher cousin pool), a demotion queue of various extents scheduled to be demoted to a lower pool (e.g., either a child or a lower cousin pool), and information relating to related child pools, cousin pools, and parent pools. Such information may be retained in metadata associated with the particular extent pool, or may be associated with the pool using other mechanisms known to one of ordinary skill in the art.

In similar fashion to data structure 302, information associated with data structure 304 for a particular extent within the extent pool includes such metric information as write or read counter data, a last time the extent was promoted (which may be time-stamped), and a flag initializing the extent to false, and set upon a write. Storage manager 106 (again, FIG. 1) may retain and update such data structures 302, and 304 in the organization, promotion and demotion of data segments within the hierarchical tree.

Figure 4:
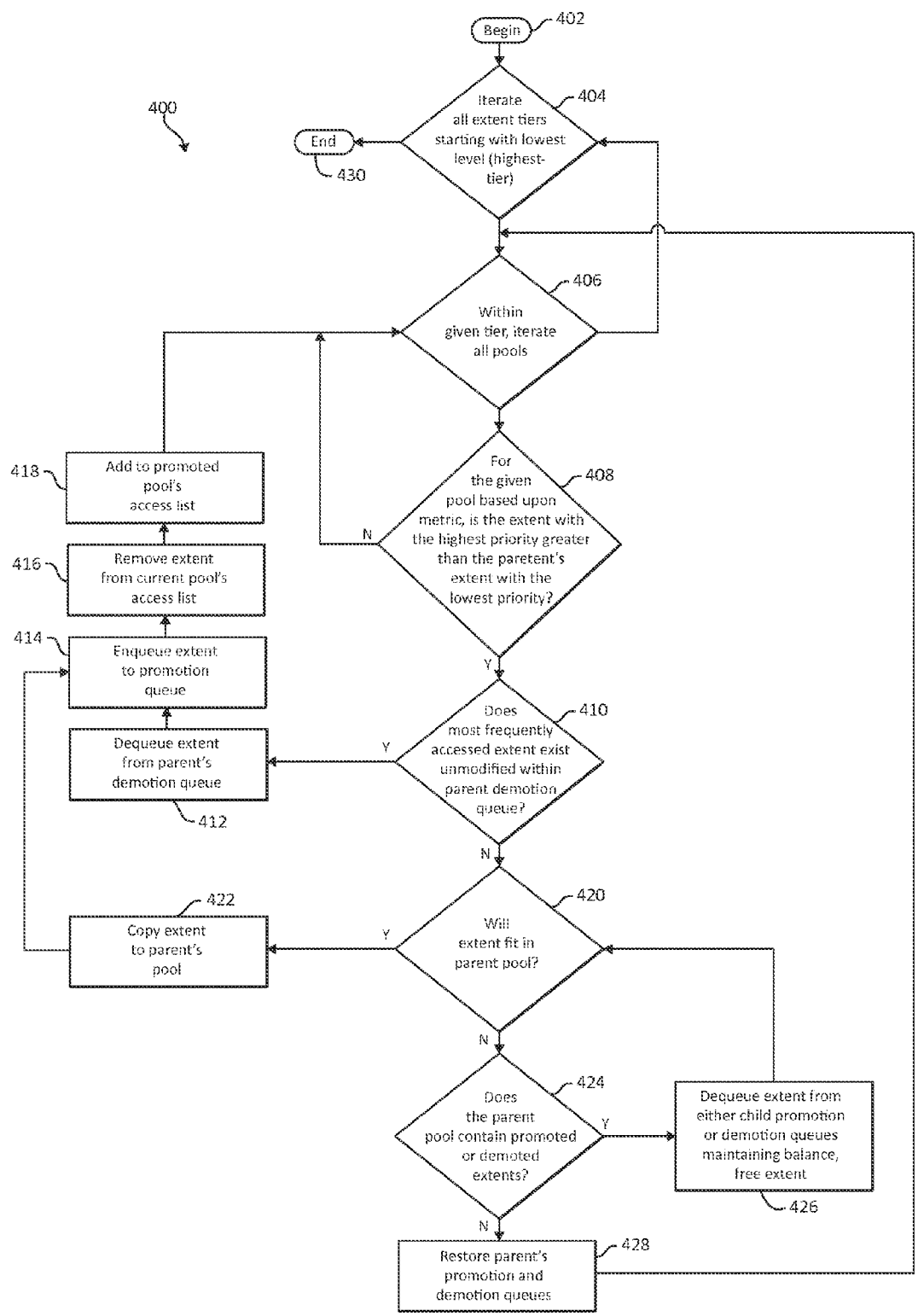
FIG. 4 illustrates an exemplary method for discovery and promotion of data segments between pools in a tiered-storage environment.
Figure 5:
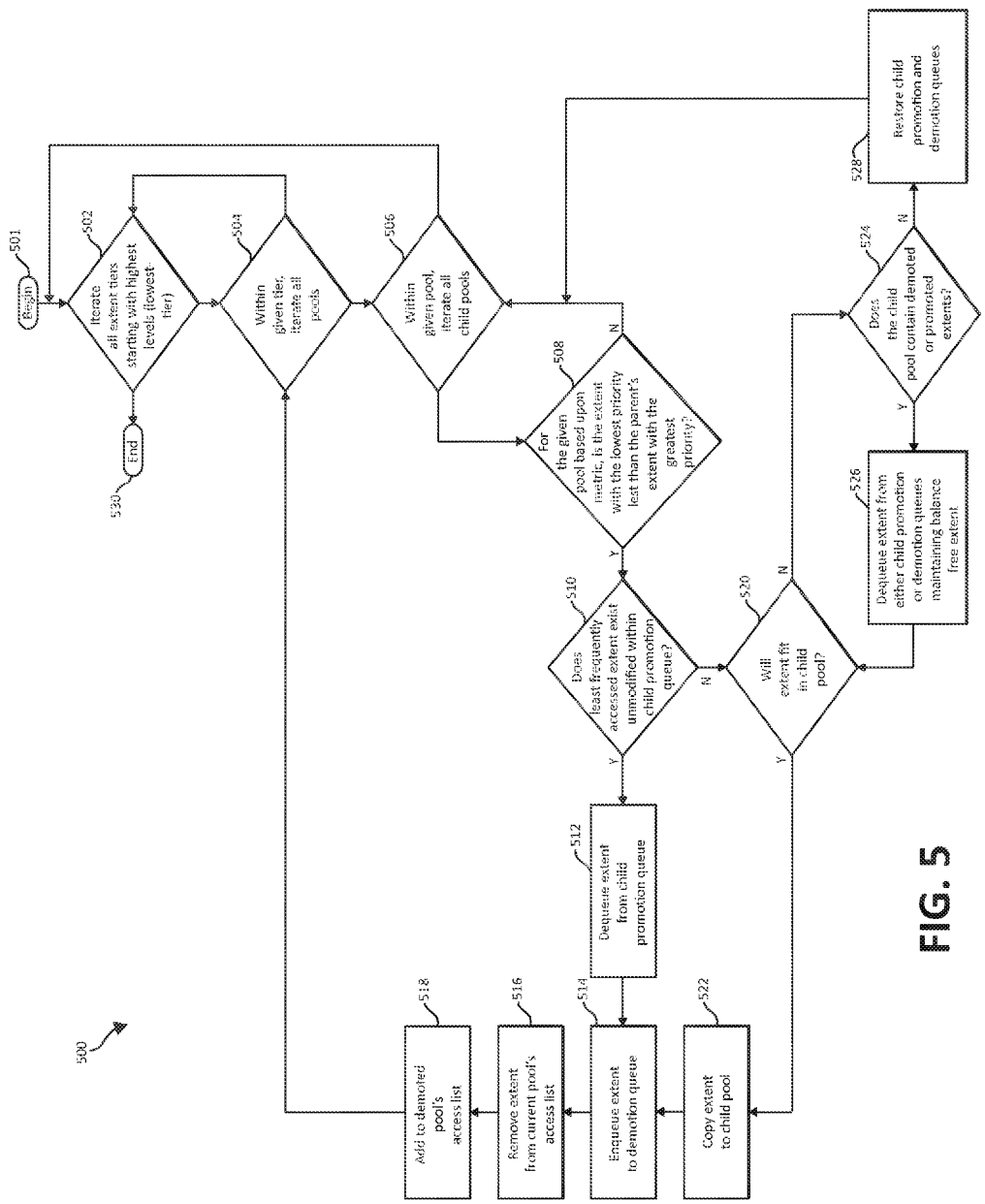
FIG. 5 illustrates an exemplary method for discovery and demotion of data segments between pools in a tiered-storage environment.

FIGS. 4 and 5, following, illustrate a flow-chart diagram of exemplary methods 400 and 500 for discovery and promotion of data segments between storage pools in the hierarchical tree structure, and discovery and demotion of data segments in the hierarchical tree structure, respectively. In the following FIGS. 4 and 5, the data segments discovered and promoted and/or demoted are extents. As one of ordinary skill in the art will appreciate, various steps in the methods 400 and 500 may be implemented in differing ways to suit a particular application. In addition, the described methods may be implemented by various means, such as hardware, software, firmware, or a combination thereof operational on or otherwise associated with the computing storage environment. For example, the methods 400 and 500 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning first to FIG. 4, method 400 illustrates an exemplary discovery and promotion process for extents in a higherarchical tree structure. Method 400 begins (step 402) with an n level-order traversal of the hierarchical tree structure by iteration of all extent tiers, beginning with the lowest level pool in the highest tier (step 404). Within a given tier then, each pool is then iterated (step 406). For any one pool in the given tier, based on the metric under consideration, the method 400 queries if the extent with the highest "priority" (i.e., the extent having the greatest quantity, strongest attribute, or largest quality, etc., of the metric) is greater in priority than a corresponding parent extent having the lowest priority (step 408). If this is not the case, the method then iterates to the next (rightward) pool in the given tier.

If this is the case, then the method 400 queries whether the most frequently accessed extent exists unmodified within a parent demotion queue (step 410). If so, then the extent is dequeued from the parent pool's demotion queue (step 412), and the extent is enqueued to the promotion queue (step 414). The extent is removed from the current pool's access list (step 416), and added to the promoted pool's access list (step 418). The method 400 then iterates to the next storage pool (again, step 406).

Returning to step 410, if this is not the case, the method 400 queries whether the extent will fit in the parent pool (step 420). If so, the extent is copied to the parent pool (step 422) in a constant time copy operation, and the steps 414, 416, and 418 are carried out as previously described. Alternatively, if no room is found in the parent pool, the method queries whether the parent pool contains promoted or demoted extents (step 424). If so, the extent is dequeued from either the child promotion or demotion queues to maintain balance and free the extent (step 426). If the parent pool does not contain either promoted or demoted extents, the parent's promotion and demotion queues are restored (step 428), and the method 400 returns to step 406 to reiterate through an additional storage pool in the given tier. When all extent pools in each extent tier (again from highest to lowest) have been iterated, the method 400 ends (step 430).

As one of ordinary skill in the art will appreciate, the method 400 (and 500 to be now described) may be performed on a scheduled interval. The scheduling may occur pursuant to various implementations of the computing storage environment. For example, the scheduling may coincide with periods of high and/or low storage activity. The scheduling may be configured by a system administrator using the storage manager 106 (FIG. 1) or by other similar means.

Turning now to FIG. 5, method 500 illustrates an exemplary discovery and demotion process for extents in a higherarchical tree structure. Method 500 begins (step 501) with a reversed n level-order traversal of the hierarchical tree structure by iteration of all extent tiers, beginning with the lowest level pool in the lowest tier (step 502). Within a given tier then, each pool is then iterated (step 504), and for each given pool, the corresponding child pools are iterated (step 506). For any one pool in the given tier, based on the metric under consideration, the method 500 queries if the extent with the lowest priority (i.e., the extent having the lowest quantity, weakest attribute, or smallest quality, etc., of the metric) is lower in priority than a corresponding parent extent having the highest priority (step 508). If this is not the case, the method then iterates to the next (rightward) child pool for the given tier (again, step 506).

If this is the case, then the method 500 queries whether the least frequently accessed extent exists unmodified within a child promotion queue (step 510). If so, then the extent is dequeued from the child pool's demotion queue (step 512), and the extent is enqueued to the demotion queue (step 514). The extent is removed from the current pool's access list (step 516), and added to the demoted pool's access list (step 518). The method 500 then iterates to the next storage pool (again, step 504).

Returning to step 510, if this is not the case, the method 500 queries whether the extent will fit in the child pool (step 520). If so, the extent is copied to the parent pool (step 522) in a constant time copy operation, and the steps 514, 516, and 518 are carried out as previously described, returning to step 504 to iterate through an additional pool on the given tier. Alternatively, if no room is found in the parent pool, the method queries whether the child pool contains promoted or demoted extents (step 524). If so, the extent is dequeued from either the child promotion or demotion queues to maintain balance and free the extent (step 526). If the child pool does not contain either promoted or demoted extents, the child's promotion and demotion queues are restored (step 528), and the method 500 returns to step 506 to iterate through an additional child pool. When all extent pools in each extent tier (again from lowest) have been iterated (again, step 502), the method 500 ends (step 530).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for data migration between each of a plurality of storage pools organized into extent tiers in a computing storage environment by a processor device, comprising:

categorizing each of the plurality of storage pools by a metric shared between data segments assigned to any one of the plurality of storage pools, wherein the plurality of storage pools includes a child pool and a parent pool, the data segments are prioritized in the any one of the plurality of storage pools based on the metric, and the metric includes at least one of write or read counter data, a last time a data segment was promoted, and a flag initializing a corresponding data segment to false;

iterating each child pool and each of the plurality of storage pools in all extent tiers with a reversed n level-order traversal and performing, for each of the plurality of storage pools:

discovering, on a predetermined interval and based on the metric, whether a priority of a data segment with a lowest priority on the child pool of the plurality of storage pools is less than a priority of a data segment with a highest priority on the parent pool of the priority of storage pools, determining whether a least frequently accessed data segment exists unmodified within a child promotion queue, if the priority of the data segment with the lowest priority on the child pool is less than the priority of the data segment with the highest priority on the parent pool;

dequeuing the data segment from the child promotion queue, if the least frequently accessed data segment exists unmodified within the child promotion queue;

determining whether room is available in the child pool to include the data segment; and demoting the data segment with the highest priority on the parent pool to the child pool if room is available;

wherein pursuant to the demoting the data segment with the highest priority on the parent pool to the child pool, a copy of the data segment with the highest priority on the parent pool is retained to allow for migration back in constant time.

2. The method of claim 1, wherein categorizing each of the plurality of storage pools by the metric shared between the data segments assigned to the any one of the plurality of storage pools includes classifying each of the plurality of storage pools by minimum and maximum attributes of the metric shared between the data segments, wherein each data segment assigned to the any one of the plurality of storage pools meets at least the minimum, but does not exceed the maximum, attributes of the metric.

3. The method of claim 1, wherein categorizing each of the plurality of storage pools by the metric shared between the data segments assigned to the any one of the plurality of storage pools includes classifying each of the plurality of storage pools by a shared performance metric of the data segments assigned to the any one of the plurality of storage pools.

4. The method of claim 1, wherein categorizing each of the plurality of storage pools by the metric shared between the data segments assigned to the any one of the plurality of storage pools includes:

organizing a plurality of tiers of a tree structure, each of the plurality of tiers capable of including at least one of the plurality of storage pools, and designating some of the plurality of storage pools residing in a same tier of the plurality of tiers as cousin storage pools, each of the cousin storage pools organized along the same tier such that the attributes of the metric shared between the data segments in the any one of the cousin storage pools increase from left to right across the same tier.

5. The method of claim 4, wherein organizing the plurality of tiers of the tree structure includes designating each of the plurality of tiers to correspond to levels of the attributes of the metric shared between the data segments, wherein the attributes of the metric vary between the levels significantly more than the attributes of the metric vary between the cousin storage pools.

6. The method of claim 5, wherein categorizing each of the plurality of storage pools by the metric shared between the data segments assigned to the any one of the plurality of storage pools includes categorizing each of the plurality of storage pools by at least one of a read/write ratio, a read/write rate, a number of accesses over the predetermined interval, a redundant array of independent disks (RAID) array rank, a latency, a storage class, striping, and partitioning characteristics.

7. The method of claim 4, wherein organizing the plurality of tiers of the tree structure includes designating a plurality of storage classes, including at least one of a cache storage class, a solid state drive (SSD) storage class, a redundant array of independent disks (RAID)-10 class, a tape class, a RAID-5 class, and an optical storage class to correspond to each of the plurality of tiers.

8. The method of claim 1, further including, pursuant to retaining the copy of the data segments with the highest priority on the child and parent pools, using a data pointer to map the data segments with the highest priority on the child and parent pools in lieu of moving the data segments with the highest priority on the child and parent pools.

9. A system for data migration between each of a plurality of storage pools organized into extent tiers in a computing storage environment, comprising:

a storage manager module operational in the computing storage environment, wherein the storage manager module is adapted for:

categorizing each of the plurality of storage pools by a metric shared between data segments assigned to any one of the plurality of storage pools, wherein the plurality of storage pools includes a child pool and a parent pool, the data segments are prioritized in the any one of the plurality of storage pools based on the metric, and the metric includes at least one of write or read counter data, a last time a data segment was promoted, and a flag initializing a corresponding data segment to false;

iterating each child pool and each of the plurality of storage pools in all extent tiers with a reversed n level-order traversal and performing, for each of the plurality of storage pools:

discovering, on a predetermined interval and based on the metric, whether a priority of a data segment with a lowest priority on the child pool of the plurality of storage pools is less than a priority of a data segment with a highest priority on the parent pool of the priority of storage pools, determining whether a least frequently accessed data segment exists unmodified within a child promotion queue, if the priority of the data segment with the lowest priority on the child pool is less than the priority of the data segment with the highest priority on the parent pool, dequeuing the data segment from the child promotion queue, if the least frequently accessed data segment exists unmodified within the child promotion queue, determining whether room is available in the child pool to include the data segment, and demoting the data segment with the highest priority on the parent pool to the child pool if room is available;

wherein pursuant to the demoting the data segment with the highest priority on the parent pool to the child pool, a copy of the data segment with the highest priority on parent pool is retained to allow for migration back in constant time.

10. The system of claim 9, wherein the storage manager module is further adapted for, pursuant to categorizing each of the plurality of storage pools by the metric shared between the data segments assigned to the any one of the plurality of storage pools, classifying each of the plurality of storage pools by minimum and maximum attributes of the metric shared between the data segments, wherein each data segment assigned to the any one of the plurality of storage pools meets at least the minimum, but does not exceed the maximum, attributes of the metric.

11. The system of claim 9, wherein the storage manager module is further adapted for, pursuant to categorizing each of the plurality of storage pools by the metric shared between the data segments assigned to the any one of the plurality of storage pools, classifying each of the plurality of storage pools by a shared performance metric of the data segments assigned to the any one of the plurality of storage pools.

12. The system of claim 9, wherein the storage manager module is further adapted for, pursuant to categorizing each of the plurality of storage pools by the metric shared between the data segments assigned to the any one of the plurality of storage pools:

organizing a plurality of tiers of a tree structure, each of the plurality of tiers capable of including at least one of the plurality of storage pools, and designating some of the plurality of storage pools residing in a same tier of the plurality of tiers as cousin storage pools, each of the cousin storage pools organized along the same tier such that the attributes of the metric shared between the data segments in the any one of the cousin storage pools increase from left to right across the same tier.

13. The system of claim 12, wherein the storage manager module is further adapted for, pursuant to organizing the plurality of tiers of the tree structure includes designating each of the plurality of tiers to correspond to levels of the attributes of the metric shared between the data segments, wherein the attributes of the metric vary between the levels significantly more than the attributes of the metric vary between the cousin storage pools.

14. The system of claim 13, wherein the storage manager module is further adapted for, pursuant to categorizing each of the plurality of storage pools by the metric shared between the data segments assigned to the any one of the plurality of storage pools, categorizing each of the plurality of storage pools by at least one of a read/write ratio, a read/write rate, a number of accesses over the predetermined interval, a redundant array of independent disks (RAID) array rank, a latency, a storage class, striping, and partitioning characteristics.

15. The system of claim 12, wherein the storage manager module is further adapted for, pursuant to organizing the plurality of tiers of the tree structure, designating a plurality of storage classes, including at least one of a cache storage class, a solid state drive (SSD) storage class, a redundant array of independent disks (RAID)-10 class, a tape class, a RAID-5 class, and an optical storage class to correspond to each of the plurality of tiers.

16. The system of claim 9, wherein the storage manager module is further adapted for, pursuant to retaining the copy of the data segments with the highest priority on the child and parent pools, using a data pointer to map the data segments with the highest priority on the child and parent pools in lieu of moving the data segments with the highest priority on the child and parent pools.

17. The system of claim 9, wherein the storage manager module is configurable by a user through a storage client, the metric provided to the storage manager module by the user through the storage client.

18. A computer program product for data migration between each of a plurality of storage pools organized into extent tiers in a computing storage environment by a processor device, the computer program product comprising a computer-readable non-transitory storage medium having computer-readable program code portions stored therein, the computer-readable program code portions comprising:

a first executable portion for categorizing each of the plurality of storage pools by a metric shared between data segments assigned to any one of the plurality of storage pools, wherein the plurality of storage pools includes a child pool and a parent pool, the data segments are prioritized in the any one of the plurality of storage pools based on the metric, and the metric includes at least one of write or read counter data, a last time a data segment was promoted, and a flag initializing a corresponding data segment to false;

a second executable portion for iterating each child pool and each of the plurality of storage pools in all extent tiers with a reversed n level-order traversal and performing, for each of the plurality of storage pools:

discovering, on the predetermined interval and based on the metric, whether a priority of a data segment with a lowest priority on the child pool of the plurality of storage pools is less than a priority of a data segment with a highest priority on the parent pool of the priority of storage pools, determining whether a least frequently accessed data segment exists unmodified within a child promotion queue, if the priority of the data segment with the lowest priority on the child pool is less than the priority of the data segment with the highest priority on the parent pool, dequeuing the data segment from the child promotion queue, if the least frequently accessed data segment exists unmodified within the child promotion queue, determining whether room is available in the child pool to include the data segment, and demoting the data segment with the highest priority on the parent pool to the child pool if room is available;

wherein pursuant to the demoting the data segment with the highest priority on the parent pool to the child pool, a copy of the data segment with the highest priority on the parent pool is retained to allow for migration back in constant time.

19. The computer program product of claim 18, further including a third executable portion for, pursuant to categorizing each of the plurality of storage pools by the metric shared between the data segments assigned to the any one of the plurality of storage pools, classifying each of the plurality of storage pools by minimum and maximum attributes of the metric shared between the data segments, wherein each data segment assigned to the any one of the plurality of storage pools meets at least the minimum, but does not exceed the maximum, attributes of the metric.

20. The computer program product of claim 18, further including a third executable portion for, pursuant to categorizing each of the plurality of storage pools by the metric shared between the data segments assigned to the any one of the plurality of storage pools, classifying each of the plurality of storage pools by a shared performance metric of the data segments assigned to the any one of the plurality of storage pools.

21. The computer program product of claim 18, further including a third executable portion for, pursuant to categorizing each of the plurality of storage pools by the metric shared between the data segments assigned to the any one of the plurality of storage pools:

organizing a plurality of tiers of a tree structure, each of the plurality of tiers capable of including at least one of the plurality of storage pools, and designating some of the plurality of storage pools residing in a same tier of the plurality of tiers as cousin storage pools, each of the cousin storage pools organized along the same tier such that the attributes of the metric shared between the data segments in the any one of the cousin storage pools increase from left to right across the same tier.

22. The computer program product of claim 21, further including a fourth executable portion for, pursuant to organizing the plurality of tiers of the tree structure, designating each of the plurality of tiers to correspond to levels of the attributes of the metric shared between the data segments, wherein the attributes of the metric vary between the levels significantly more than the attributes of the metric vary between the cousin storage pools.

23. The computer program product of claim 22, further including a fifth executable portion for, pursuant to categorizing each of the plurality of storage pools by the metric shared between the data segments assigned to the any one of the plurality of storage pools, categorizing each of the plurality of storage pools by at least one of a read/write ratio, a read/write rate, a number of accesses over the predetermined interval, a redundant array of independent disks (RAID) array rank, a latency, a storage class, striping, and partitioning characteristics.

24. The computer program product of claim 21, further including a fourth executable portion for, pursuant to organizing the plurality of tiers of the tree structure, designating a plurality of storage classes, including at least one of a cache storage class, a solid state drive (SSD) storage class, a redundant array of independent disks (RAID)-10 class, a tape class, a RAID-5 class, and an optical storage class to correspond to each of the plurality of tiers.

25. The computer program product of claim 19, further including a fourth executable portion for, pursuant to retaining the copy of the data segments with the highest priority on the child and parent pools, using a data pointer to map the data segments with the highest priority on the child and parent pools in lieu of moving the data segments with the highest priority on the child and parent pools.

* * * * *